Dec. 22, 1953   S. J. LUKASIEWICZ ET AL   2,663,744
CATALYTIC HYDRATION OF OLEFINS
Filed Nov. 14, 1949
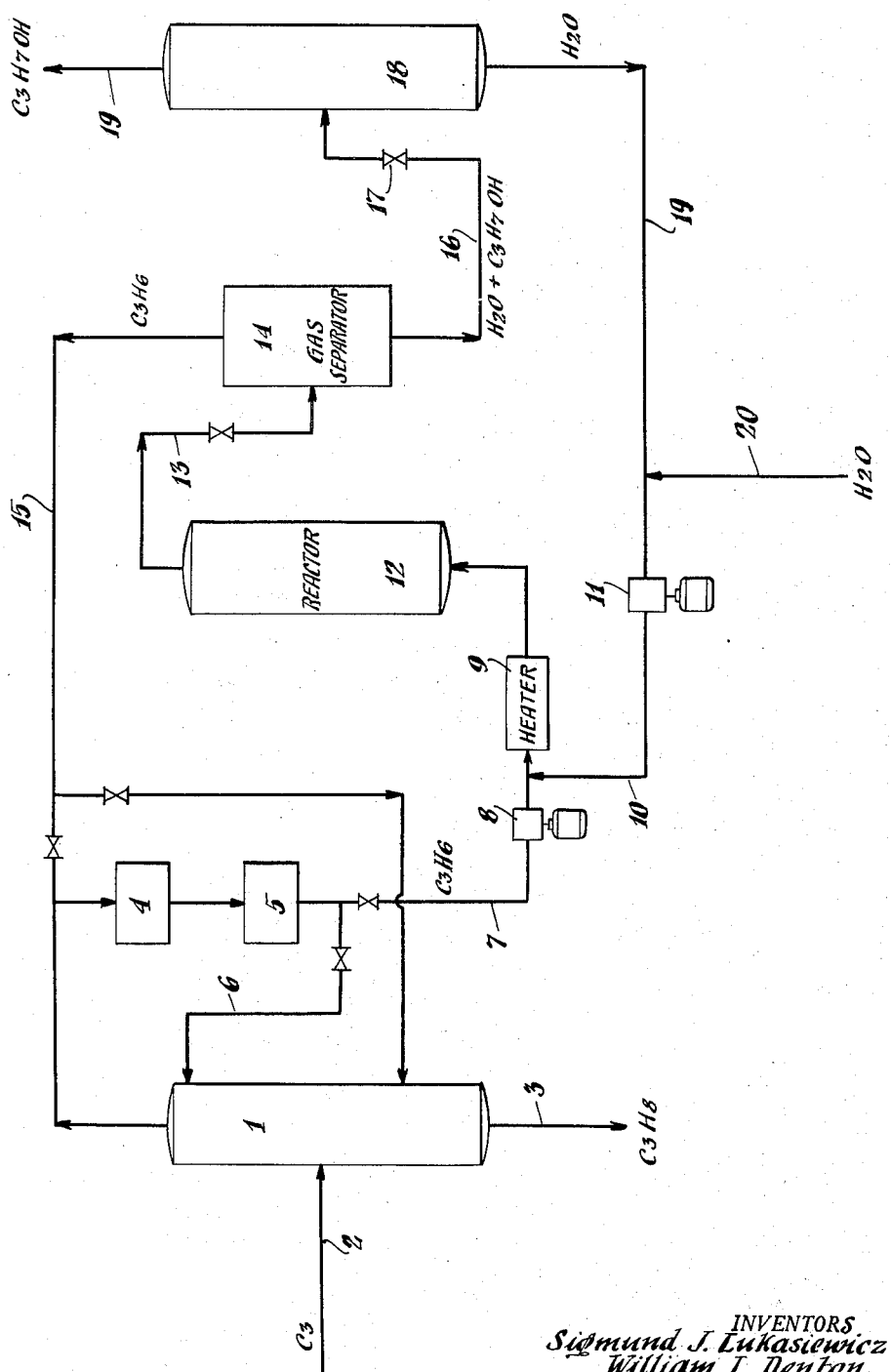
INVENTORS
Sigmund J. Lukasiewicz
William I. Denton
BY
Oswald G. Hayes
AGENT OR ATTORNEY Patented Dec. 22, 1953

2,663,744

UNITED STATES PATENT OFFICE 2,663,744

CATALYTIC HYDRATION OF OLEFINS

Sigmund J. Lukasiewicz and William I. Denton, Woodbury, N. J., assignors to Socony-Vacuum Oil Company, Incorporated, a corporation of New York Application November 14, 1949, Serial No. 127,168

6 Claims. (Cl. 260—641)

This invention relates to a process for the catalytic hydration of olefins to produce alcohols and is specifically concerned with an improvement in known processes whereby production of undesired by-products is suppressed and high yields of the desired alcohols are obtained. The invention is particularly well adapted to hydration of olefins having 3 to 5 carbon atoms.

It has been suggested heretofore that various porous adsorptive solids be used for the catalytic hydration of olefins in the production of alcohols, and a variety of suitable adsorptive catalysts have been suggested. Of primary interest, because of ready availability at relatively low cost are the oxides of silicon and aluminum of synthetic or natural origin. Composites of silica and alumina in their many commercially available forms are found to be very effective catalysts for the hydration of olefins. This invention pertains to porous adsorptive solids suitable for catalytic hydration in general and the discussion herein is directed primarily to silica-alumina composites because they combine relatively high catalytic activity for the desired conversion with moderate cost.

The adsorptive catalysts are, in general, active for promoting a large number of hydrocarbon reactions and mention is made of polymerization, cracking and hydrogen transfer as important side reactions in connection with catalytic hydration. These side reactions result in formation of polymers, saturated hydrocarbons and dense solid deposits of high carbon content referred to herein as "coke." The side reactions also result in formation of oxygenated compounds such as ketones and, in some instances, esters and other by-products.

The commercial feasibility of catalytic hydration of olefins to produce alcohols is dependent upon ability to obtain conversions of olefins to reasonable amounts of alcohols without degradation of the olefin not consumed in the production of alcohols to by-products of little or no value compared to the charge stock and desired product.

The present invention contemplates provision of a method for conducting the catalytic hydration of olefins over porous adsorptive hydration catalysts in a manner to greatly increase the selectivity of the reaction; that is, increase the percentage yield of alcohol based on olefin consumed. By certain novel expedients it has been found possible to conduct the operation in such manner that the selectivity approaches 100 per cent in the case of propylene. A selectivity of 99 per cent is readily obtained with high single-pass yields of alcohol based on total olefin charge to the reaction.

These and other objects and advantages of the invention are achieved by conditioning the catalyst by contact with water in the substantial absence of olefin prior to beginning a run by charging a mixture of water and olefin to the reaction zone. This conditioning of the catalyst results in a drastic reduction of surface area of the porous solid on the first treatment, a result which is generally regarded as undesirable in connection with porous catalysts. In typical instances the fresh catalyst is reduced to about one tenth its original surface area on the initial conditioning treatment before beginning the first run.

This conditioning treatment results in a catalyst which gives increased yields of alcohols and lower yields of saturated hydrocarbons, coke, ketones, and the like. Not only does this indicate a greater efficiency in that the olefin consumed is more largely converted to the desired product, but it further gives an important commercial advantage in that the conversion runs may be made much longer between regenerations of the catalyst to remove coke deposits. Thus, an unconditioned catalyst can be run for 3 or 4 hours before coke contamination becomes so serious that the catalyst must be regenerated by burning. When catalysts are properly conditioned in accordance with the novel process of this invention, conversion runs of several weeks are possible without regeneration of the catalyst.

The pretreatment of the catalyst is conducted at a temperature within the range effective for catalytic hydration of olefins. Preferably the pressure of conditioning treatment is also within the catalytic hydration range, thereby obviating necessity for a separate pressuring step before placing the catalyst on stream for catalytic hydration. The water used for conditioning treatment of the catalyst may be in either liquid or gaseous phase; in general, phase of the conditioning water is determined by the phase desired in the subsequent hydration treatment as will appear from the following discussion of a preferred embodiment of this invention. Where water vapor is employed, pressures upwards of 500 pounds per square inch are preferred.

Best results are obtained if the catalyst is continuously kept in contact with the water as the hydrocarbon is introduced. That is, the conditioning water is not purged from the system before starting the run.

In addition to the advantages arising from conditioning the catalyst by treatment with water, it has been found that further improvements in operation follow upon maintaining water in the liquid phase in contact with the catalyst at all times during the catalyic hydraion treatment. This expedient, which is referred to herein as the "flooded reactor technique" increases the selectivity still further by inhibiting polymer formation and reducing coke formation to a negligible figure, thus making it possible to operate for one or more months before costly regeneration of the catalyst is required. In the case of propylene, polymer formation is entirely eliminated by this preferred embodiment. Two modifications of the "flooded reactor" technique are practical. With flow of liquid water down over the catalyst and upward countercurrent or downward concurrent flow of the reactants; the catalyst is first wet with liquid water and then the hydrocarbon is introduced into the reaction zone while at the same time maintaining the flow of liquid water at a rate high enough to keep the catalyst wet at all times. When concurrent upward flow is used, the reaction zone is filled with liquid water before the hydrocarbon is introduced and liquid water is maintained in contact with the catalyst at all times. It will be apparent to those skilled in the art that any one of the three methods of reactant flow may be used, but under certain circumstances one method may be more desirable than another. For example, with countercurrent flow the conversion is not limited by the theoretical equilibrium while with concurrent upward flow it is possible to obtain high internal molar ratios of water to hydrocarbon (100:1 or higher) while pumping low external molar ratios of water to hydrocarbon (e. g. 2:1) thus simplifying the separation of the alcohol from the water.

When the process is operated wholly in the vapor phase, it is found that the mol ratio of water to olefin is an important factor with respect to yield of the desired product. The catalytic hydration reaction is essentially reversible in nature and the presence of a large excess of water tends to displace the equilibrium towards formation of greater proportions of alcohol. A true vapor phase reaction operates best at a mol ratio of 10:1 and thus requires that the recovery equipment be adapted to handle tremendous quantities of water as compared with the quantities of alcohol and unconverted olefin leaving the reaction zone.

By way of contrast, the flooded reactor technique makes it possible to charge a mixture having a water to olefin mol ratio of about 2 and passing an equivalent quantity of water with the reaction effluent to the recovery equipment. The mol ratio in the reaction zone is, however, tremendously higher and may be on the order of 50 or 100:1.

This invention therefore contemplates the improvement in catalytic hydration which results from water preconditioning of the catalyst and a preferred embodiment involves preconditioning with liquid water followed by reaction under conditions such that the catalyst will remain wet with liquid water when hydrocarbon is flowing through the catalyst mass.

Further objects and advantages of the invention will be understood from consideration of the detailed description below taken in connection with the drawings annexed hereto wherein the single figure represents diagrammatically apparatus for conducting the improved process of this invention.

Referring to the single figure of the drawing, a suitable olefin fraction, for example propylene, is prepared in fractionating column 1 from a feed stock supplied by line 2. The feed stock may be a normal refinery C₃ cut containing propylene and propane in roughly equal proportions or may be a relatively pure propylene stream. Other charge mixtures containing a suitable proportion of olefin may also be employed. Propane is removed from the bottom of the column 1 by line 3 to be used for such purposes as gaseous fuel or to be cracked to provide additional propylene. The overhead of the column is transferred to a condenser 4 from which the condensate is collected in an accumulator 5. Part of the condensate is returned to the top of the column as reflux by line 6 while a desired quantity of feed for the process passes through line 7 by way of pump 8 to a heater 9. Water from line 10 under pressure supplied by pump 11 is added to the stream entering heater 9. The hot effluent mixture of water and propylene passes to a reactor 12 containing a bed of porous adsorptive catalyst maintained under suitable temperature and pressure as will appear hereinafter. The reactor effluent is transferred by line 13 to a gas separator 14 from which unreacted propylene is taken off by line 15 and returned to condenser 4. The settled liquid from separator 14 containing water and isopropanol is transferred by line 16 through expansion valve 17 to fractionator 18.

The overhead of fractionator 18 is an azeotropic mixture of isopropanol and water removed by line 19 for condensation and such purification as may be desired. Bottoms from tower 18 are constituted almost wholly by water from which the alcohol has been stripped and pass by line 19 to the pump 11 for recirculation to the reaction vessel 12. Pure water is added by line 20 as makeup.

In a typical operation, the feed at line 2 was a refinery C₃ cut containing 53.5 per cent propylene. The overhead of fractionator 1, operated at 300 p. s. i. g., contained 92 per cent by weight of propylene and was combined with recycle from the gas separator 14 containing 89 per cent by weight of propylene to give a mixed stream containing 90 per cent by weight of propylene. Pumps 8 and 11 were operated to deliver water and hydrocarbon under 750 p. s. i. g. and the mixture was heated in heater 9 to 400° F. and passed through silica-alumina catalyst which had been pretreated with water at reaction conditions, namely 750 pounds and 400° F. The reactor effluent was expanded to 300 pounds, at which pressure unconverted propylene was separated in separator 14 and recycled. The liquid phase from the separator 14 was expanded to atmospheric pressure for fractionation in tower 18 giving an overhead containing 88 per cent by weight of isopropyl alcohol.

Catalytic hydration of olefins according to this invention may be conducted over a wide range of conditions. In general, elevated temperatures are necessary, in excess of 250° F. for flooded reactor operation and above about 300° F. for vapor phase reactions. It is desirable to operate below temperatures at which extensive cracking occurs and for this reason the maximum desirable temperature is about 700° F. Best operations are obtained at 350–575° F. for flooded reactor, preferably 400°–500° F., and 500–700° F., preferably 550–600° F. for vapor phase reactions. Elevated pressures are necessary for good operation and it will be apparent that the pressure must be adjusted relative to the temperature to maintain the phase relationships desired. Pressures of 375–6000 p. s. i. g. are suitable but better conditions are found between 500 and 2500 p. s. i. g. It is preferred to operate at about 1500 pounds both under flooded reactor conditions and vapor phase conditions. Pressures above 3000 p. s. i. g. increase conversion but also increase processing difficulties.

The two types of operation, namely vapor phase and flooded reactor, differ greatly with respect to desirable pressures, temperatures, mol ratios of water to hydrocarbon and space velocity. As used herein space velocity refers to volumes of liquid feed per hour per volume of catalyst space. Desirable mol ratios are controlled by two opposing considerations. The higher the mol ratio, the greater the selectivity of the process but increased mol ratios also increase the costs of handling large quantities of excess water in charge preparation and product recovery. Vapor phase reactions operate satisfactorily at temperatures of 550–700 F., and mol ratios between 5 and 40:1, preferably between 7 and 15:1 with optimum results in the neighborhood of 10:1. Using flooded reactor conditions temperatures as low as 375° F. may be used and external mol ratios between 0.5 and 20:1 are suitable with preference for ratios between 1 and 5:1.

The vapor phase reactions may be conducted at space velocities preferably between 1 and 5 with an optimum at about 3. Space velocities for flooded reactor operation may vary between 0.2 and 5.0, preferably 0.5 to 2.0, the minimum of the preferred range being about optimum.

The invention may be practiced in connection with any of the porous adsorptive hydration catalysts known to the art, such as alumina, silica, zirconia, thoria, etc. and composites of two or more oxides which may be of natural or synthetic origin. Best results are obtainable with silica-alumina catalysts prepared by coprecipitation or cogelation of silica and alumina from aqueous solution. Although both silica gel and alumina are somewhat effective for catalytic hydration when used alone, silica-alumina composites are considerably more effective than either silica or alumina alone. Greatest activity is found in composites containing a major proportion of silica and about 1 to about 35 per cent by weight of alumina.

The majority of the catalysts described in the following specific examples were prepared by the bead catalyst technique of Marisic Patent 2,384,946, dated September 18, 1945. Co-gels of silica and alumina having sufficiently short gelation times to be commercially feasible for bead operation are prepared at pH values in the neighborhood of 7 and the resultant gels contain substantial amounts of zeolitic sodium. It has been found that sodium is a specific poison for hydration catalysts, see Example VI below, and this material must be substantially removed from the catalyst in order to get satisfactory results. As described in the Marisic patent, the sodium is readily removed by base exchange with salts of polyvalent metals, ammonium or the like.

For the most part the following examples show the use of bead type catalysts varying only to minor degrees in composition and prepared in substantially identical manner except for noted differences. This showing of similar catalysts is for the purpose of affording a basis for strict comparison of the novel techniques of this invention but it may be noted that catalysts of a wide variety of varying compositions have been examined. The invention is applicable, as stated above, to the porous adsorptive hydration catalysts in general.

EXAMPLE I

A silica-alumina bead catalyst containing 90 per cent silica and 10 per cent alumina by weight and substantially free of sodium oxide was treated with water at 590° F. and a pressure of 1500 p. s. i. g. A total volume of 500 ml. of catalyst was thus contacted with 975 ml. of water at a space velocity of about 2 in the absence of olefin. Thereafter, a mixture containing 924 grams (22 mols) of propylene and 3991 grams (222 mols) of water was brought to 590° F. and passed through the catalyst at a pressure of 1500 p. s. i. g. and a space velocity of 3. After 4 hours of operation, 111 grams of pure isopropyl alcohol was produced. This represents a yield of 12 weight per cent of the alcohol based on propylene charged. Further data on the run are shown in Table I below.

EXAMPLE II

The catalyst of this example was a silica-alumina composite containing 87.5 per cent $SiO_2$ and 12.5 per cent $Al_2O_3$. The catalyst was prepared by coprecipitation, washed, base exchanged for removal of sodium and water washed until the effluent was free of salts removed from the gel. Thereafter, the gel was kneaded to form a heavy slurry, cast in perforated steel plates, and dried. A total volume of 500 ml. of catalyst was pretreated with 500 ml. of water at 587° F., 1500 p. s. i. g. and a space velocity of 1. The charge was made up by mixing 247 grams (5.9 mols) of propylene and 1000 grams of water (55.5 mols) and charged to the catalyst under the same conditions as those stated for the water pre-treatment, except that the space velocity was increased to 3. During 1 hour of operation, 37 grams of pure isopropyl alcohol was produced, equivalent to 15 weight per cent of isopropyl alcohol based on propylene charge. See Table I for further data on this run.

EXAMPLE III

The two preceding examples illustrate essentially vapor phase reaction and the present example is concerned with a concurrent upward type operation under flooded reactor conditions. A total of 500 ml. of catalyst as described in Example I was treated with 500 grams of water maintained in liquid phase at 412° F., 750 p. s. i. g. and a space velocity of 1.0. The charge mixture was made up of 346 grams (8.3 mols) of propylene and 300 grams (16.7 mols) of water which was pumped over a period of 4 hours through the reactor under the same temperature and pressure conditions as those prevailing for the pre-treatment and space velocity of about 0.5. As a result of the pre-treatment, the reactor was filled with liquid water prior to the introduction of the charge which bubbled up through the water in the reaction space. The product contained 38 grams of pure isopropyl alcohol representing a yield of 11 per cent by weight based on propylene charged.

EXAMPLE IV

This is a further example of the flooded reactor technique using a fresh batch of the same catalyst as that described in Example I. The pretreatment was 500 grams of water in the liquid phase at the same conditions as those prevailing in the reaction. 356 grams of propylene (8.5 mols) and 370 grams of water (20.6 mols) were pumped into the reactor over a period of two hours. Reaction conditions were 414° F., 1500 p. s. i. g. and a space velocity of 1.0 over 500 ml. of catalyst. The yield was 48 grams of isopropyl alcohol, 13.5 weight per cent based on propylene.

EXAMPLE V

This example illustrates the fact that the process is capable of using relatively impure olefins and was operated under flooded reactor conditions. Pre-treatment of a fresh batch of the same catalyst as that described in Example I was with 500 grams of liquid water at reaction conditions. 200 grams of liquefied petroleum gas of the type sold as "bottled gas" for domestic use and containing 107 grams (2.5 mols) of propylene and 93 grams (2.1 mols) of propane were charged along with 120 grams (6.7 mols) of water over a period of 2 hours. Reaction conditions were 400° F., 750 p. s. i. g. and a space velocity of 0.5. The yield was 10.3 weight per cent of isopropanol based on propylene charged.

EXAMPLE VI

The catalyst in this case was similar to the bead catalyst of Example I except that it had not been base exchanged for removal of sodium. The pretreatment was 500 grams of water at 597° F., 1500 p. s. i. g. and a space velocity of 1.0 over 500 ml. of catalyst containing about 4 per cent by weight of sodium oxide with a balance of alumina and silica in the weight ratio of 7 to 93. The charge was 240 grams (5.7 mols) of propylene and 1015 grams (57 mols) of water pumped through the reactor during one hour under the same conditions as the pretreatment described except that the space velocity was 3. No isopropyl alcohol was found in the reactor effluent.

EXAMPLE VII

This example was conducted without pretreatment of the catalyst and serves to illustrate the advantages of conditioning the catalyst. A fresh batch of catalyst similar to that of Example I was contacted with a mixture of 132 grams (3.14 mols) of propylene and 125 grams (6.95 mols) of water over a period of 45 minutes. The charge was preheated and reacted at a temperature of 297° F. and a pressure of 1250 p. s. i. g. at a space velocity of about 1.0. The yield of isopropanol was 1.2 weight per cent based on propylene. At the same time polymer was formed to the extent of 13.6 weight per cent based on propylene.

EXAMPLE VIII

This is a further example of operation using a fresh batch of the catalyst of Example I without water conditioning. The charge contained 173 grams of propylene (4.1 mols) and 770 grams of water (42.6 mols). The reaction mixture was preheated and reacted at 586° F., 1500 p. s. i. g. and a space velocity of about 3.0. The reactor effluent contained 8.7 per cent isopropanol and 2.9 per cent polymer based on propylene charged. In addition, 1 per cent by weight of coke based on propylene charged was deposited on the catalyst during a run of 45 minutes. This represents a selectivity of 45 weight per cent as compared with a selectivity of 99 weight per cent for Example I.

EXAMPLE IX

This is a further example of use of a catalyst similar to that of Example I under flooded reactor conditions. A total volume of 500 ml. of catalyst was treated with 500 grams of water at 430° F. and 750 p. s. i. g. Thereafter, a mixture of 512 grams of propylene (12.2 mols) and 455 grams of water (25.3 mols) was passed through the catalyst at a space velocity of 1.0, a temperature of 430° F. and a pressure of 750 p. s. i. g. over a period of 3 hours. There was no polymer formed, coke yield was very slight and an isopropanol yield of 8.5 weight per cent of propylene was obtained.

EXAMPLE X

This is a run under conditions similar to that of Example IV except that there was no conditioning of the catalyst. A fresh batch of the catalyst described in Example I was contacted with a water-propylene mixture having a mol ratio of 10:1 at 400° F., 1500 p. s. i. g. and a space velocity of 1.0. Based on propylene charged the effluent contained 4.8 per cent isopropanol, 1.3 per cent acetone, 23.0 per cent polymer and 3.3 per cent propane. This represents a selectivity of 11 weight per cent of isopropanol based on propylene converted as compared with a selectivity of 99 per cent for Example IV.

EXAMPLE XI

The catalyst in this instance was a silica-alumina gel containing 97 per cent silica and 3 per cent alumina. The catalyst was conditioned by a treatment with steam under the reaction conditions. After conditioning, a mixture of water and propylene in the mol ratio of 10:1 was passed over the catalyst at a space velocity of 3 for 3 hours at 595° F. and 1500 p. s. i. g. The yield of isopropanol was 9.6 per cent by weight at 94 per cent selectivity.

EXAMPLE XII

Straight silica gel was used as the catalyst under conditions generally similar to those of Example XI with a yield of 1.5 per cent isopropanol. Further details are shown in Table I below.

EXAMPLE XIII

Activated alumina under conditions similar to those of Example XI gave a yield of 4.9 per cent isopropanol. Further details in Table I.

EXAMPLE XIV

The results using alumina gel were relatively poor as shown in Table I.

EXAMPLE XV

The gel of silica and alumina containing 75 per cent silica and 25 per cent alumina conditioned by steam gave a yield of 10.5 per cent isopropanol at 99 per cent selectivity.

EXAMPLE XVI

Activated montmorillonite sold under the trade name of Super Filtrol is also effective for the present purpose as shown in Table I.

EXAMPLE XVII

Hydration of isobutylene was conducted over the catalyst of Example I at a water to olefin ratio of 2 and space velocity of 1 for one hour. The catalyst was preconditioned with liquid water at the reaction conditions of 420° F. and 1500 p. s. i. g. The yield of tertiary butyl alcohol was 12.2 per cent.

EXAMPLE XVIII

A silica-zirconia gel containing 90.6 per cent $SiO_2$ and 9.4 per cent $ZrO_2$ by weight was treated with 500 cc. of water at 430° F. and 1500 p. s. i. over a period of one hour. With the catalyst still in contact with the liquid water a mixture of 171 g. (4.08 moles) of propylene and 150 g. (8.34 moles) of additional water was pumped at a space velocity of 1.0, 430° F., and 1500 p. s. i. 15 g. (0.25 mole) of isopropyl alcohol were formed with substantially no other products.

EXAMPLE XIX

This is another example of pretreating the catalyst of Example I with liquid water followed by operating using the flooded reactor technique. The catalyst was treated with 500 g. of water at 430° F. and 1500 p. s. i. over a period of one hour. The hydrocarbon addition was then started without stopping water addition. 200 g. (11.1 moles) of water and 166 g. (4.0 moles) of propylene were pumped at a space velocity of 1.0, 430° F., and 1500 p. s. i. Twenty-eight (28) grams (0.47 mole) of isopropyl alcohol were produced with only a trace of coke. This represents a yield of 16.7 weight per cent and a selectivity of better than 99 per cent.

EXAMPLE XX

A run identical to that of Example XIX was made except that pretreatment of the fresh catalyst with water was omitted. The product contained only 19.4 grams alcohol and in addition large amounts of polymer and coke were formed. This represents a yield of isopropanol of 11.7 weight per cent as compared to 16.7 per cent and a selectivity of only 30 per cent. See Table I for details.

EXAMPLE XXI

A run identical to Example XX was made except that the catalyst used was regenerated catalyst from Example XIX instead of fresh catalyst. This example shows that under some operating conditions pretreatment of the catalyst in prior run does not eliminate the necessity of subsequent pretreatment. Thus, in this run a catalyst which had been pretreated in Example XIX was regenerated and used without further pretreatment in this run under the conditions described in Example XIX. Only 8.1 per cent yield of isopropanol was obtained at a selectivity of 34 per cent. See Table I for details.

EXAMPLE XXII

This run is designed to show that extremely high yields can be obtained by this process without any sacrifice in selectivity. In this run 2500 ml. of fresh catalyst similar to that described in Example I was treated with liquid water at a space velocity of 4 for one hour at 425° F. and 1500 p. s. i. The flow was concurrent downward through the reactor. 4560 grams (253 moles) of water and 415 grams of hydrocarbon consisting of 185 grams (4.4 moles) of propylene and 220 grams (5.0 moles) of propane were pumped over the catalyst at 435° F. and 1500 p. s. i. over a period of four hours. The product contained 100 grams of alcohol, no by-products and only a trace of coke was laid down on the catalyst. This represents a yield of 56 weight per cent of isopropanol (based on propylene charged) at a selectivity of about 99 per cent.

EXAMPLE XXIII

A catalyst prepared by impregnating silica gel with tungsten oxide to prepare a finished catalyst of 20 weight per cent tungsten oxide was pretreated with liquid water under reaction conditions. While keeping the catalyst wet with liquid water, a reaction mixture of 2 moles of water per mole of propylene was pumped through the catalyst at 1500 pounds pressure, 422° F. and a space velocity of 1 for 1.5 hours. The effluent showed a yield of 8.0 weight per cent isopropanol and no polymer.

EXAMPLE XXIV

Hydration of pentene-1 was conducted over the catalyst of Example I. The catalyst was pretreated with water at 425° F. and 600 p. s. i. and then 174 grams of pentene-1 and 440 grams of water were passed over the catalyst under the same conditions at a space velocity of 0.5. The effluent from the reactor contained 7.1 grams amyl alcohol or a yield per pass of 4.1 weight per cent.

EXAMPLE XXV

Hydration of mixed amylenes (chiefly pentene-2 and trimethyl ethylene) was conducted under the same conditions as used in Example XXIV. 165 grams amylenes and 440 grams water gave 7.6 grams amyl alcohol or a yield per pass of 4.6 weight per cent.

EXAMPLE XXVI

Hydration of hexene-1 was conducted over the catalyst of Example I. The catalyst was pretreated with water at 375 p. s. i. and 425° F. 144 grams hexene-1 and 440 grams water were passed over the catalyst under the same conditions at a space rate of 0.5. The effluent from the reactor contained 3.5 grams alcohol or a yield per pass of 2.4 weight per cent.

Table I

| Example | Catalyst | | | | | Reaction conditions | | | | | | Yield (weight percent) | | | | | Selectivity |
|---|---|---|---|---|---|---|---|---|---|---|---|---|---|---|---|---|---|
| | Catalyst type | $SiO_2$ | $Al_2O_3$ | $Na_2O$ | Conditioning | Phase | $H_2O/C_3H_6$ | Temp., °F. | Pressure | Space velocity | Duration, hrs. | Isopropanol | Polymer | Propane | Acetone | Coke | |
| I | Gel | 90 | 10 | 0.1 | Steam | Vapor | 11 | 590 | 1,500 | 3 | 4 | 12 | 0.0 | 0.0 | 0.04 | 0.04 | 99 |
| II | Coprecipitate and gel | 87.5 | 12.5 | | do | do | 9 | 587 | 1,500 | 3 | 1 | 15 | 0.0 | 0.0 | 0.10 | 0.03 | 99 |
| III | Gel | 90 | 10 | 0.1 | Water | Mixed | 2 | 412 | 750 | 0.5 | 4 | 11 | 0.0 | 0.0 | 0.0 | 0.1 | 98 |
| IV | do | 90 | 10 | 0.1 | do | do | 3 | 414 | 1,500 | 1 | 2 | 13.5 | 0.0 | 0.0 | 0.03 | 0.03 | 99 |
| V | do | 90 | 10 | 0.1 | do | do | 3 | 400 | 750 | 0.5 | 2 | 10.3 | 0.0 | 0.0 | 0.05 | 0.4 | 95 |
| VI | do | 89.3 | 6.7 | 4 | Steam | Vapor | 10 | 597 | 1,500 | 3 | 1 | 0.0 | | | | | |
| VII | do | 90 | 10 | 0.1 | None | do | 2 | 297 | 1,250 | 1 | ¾ | 1.2 | 13.6 | | | | |
| VIII | do | 90 | 10 | 0.1 | do | do | 10 | 586 | 1,500 | 3 | ¾ | 8.7 | 2.9 | 3.0 | 0.5 | 1.0 | 45 |
| IX | do | 90 | 10 | 0.1 | Water | Mixed | 2 | 430 | 750 | 1 | 3 | 8.5 | 0.0 | 0.0 | 0.1 | 0.1 | 98 |
| X | do | 90 | 10 | 0.1 | None | Vapor | 2 | 400 | 1,500 | 1 | 1 | 4.8 | 23.0 | 3.3 | 1.3 | | 11 |
| XI | do | 97 | 3 | | Steam | do | 10 | 595 | 1,500 | 3 | 3 | 9.6 | 0.0 | 0.0 | 0.0 | 0.5 | 94 |
| XII | Silica gel | 100 | 0 | | do | do | 10 | 589 | 1,500 | 3 | 1¾ | 1.5 | | | | | |
| XIII | Activated alumina | 0 | 100 | | do | do | 10 | 590 | 1,500 | 3 | 2 | 4.9 | 0.0 | 0.0 | 0.0 | 0.1 | 94 |
| XIV | Gel alumina | 0 | 100 | | do | do | 10 | 597 | 1,500 | 3 | 1 | 0.9 | 0.0 | 0.0 | 0.7 | | 57 |
| XV | Gel | 75 | 25 | | do | do | 8 | 590 | 1,500 | 3 | 1 | 10.5 | 0.0 | 0.0 | 0.04 | 0.03 | 99 |
| XVI | Natural | (¹) | | | Water | Mixed | 2 | 420 | 1,500 | 1 | 2 | 10.6 | 0.0 | 0.0 | 0.1 | 0.02 | 99 |
| XVII | Gel | 90 | 10 | 0.1 | do | do | ª2 | 420 | 1,500 | 1 | 1 | ª12.2 | 4.6 | | | 0.6 | |
| XVIII | do b | 90.6 | 9.4 | 0.0 | do | do | 2 | 430 | 1,500 | 1 | 1 | 8.6 | 0.0 | 0.0 | 0.0 | 0.01 | 99 |
| XIX | do | 90 | 10 | 0.1 | do | do | 3 | 430 | 1,500 | 1 | 1 | 16.7 | 0.0 | 0.0 | 0.0 | 0.01 | 99 |
| XX | do | 90 | 10 | 0.1 | None | do | 3 | 430 | 1,500 | 1 | 1 | 11.7 | 13.2 | 0.2 | 0.8 | 5.1 | 30 |
| XXI | do c | 90 | 10 | 0.1 | do | do | 3 | 430 | 1,500 | 1 | 1.5 | 8.1 | 10.5 | 0.2 | 0.0 | 0.5 | 34 |
| XXII | do | 90 | 10 | 0.1 | Water | do | | 435 | 1,500 | 0.5 | 4 | 56 | 0.0 | 0.0 | 0.0 | 0.01 | 99 |
| XXIII | 20% $WO_3$ on $SiO_2$ | 80 | | | do | do | 2 | 422 | 1,500 | 1 | 1.5 | 8.0 | 0.0 | | | | |
| XXIV | Gel | 90 | 10 | 0.1 | do | do | d 10 | 425 | 600 | 0.5 | 2.0 | d 4.1 | | | | | |
| XXV | do | 90 | 10 | 0.1 | do | do | e 10 | 425 | 600 | 0.5 | 1.8 | e 4.6 | | | | | |
| XXVI | do | 90 | 10 | 0.1 | do | do | f 14 | 425 | 375 | 0.5 | 1.5 | f 2.4 | | | | | |

ª Isobutylene substituted for propylene-product t-butyl alcohol.
b $ZrO_2$ instead of $Al_2O_3$.
c Catalyst from Example XIX regenerated.
d Pentene-1 substituted for propylene-product amyl alcohol.
e Mixed amylenes substituted for propylene-product amyl alcohol.
f Hexene-1 substituted for propylene-product hexyl alcohol
¹ Superfiltrol.

We claim:

1. A process for the catalytic hydration of olefins which comprises preconditioning a porous adsorptive hydration catalyst composed of inorganic oxide selected from the class consisting of alumina, silica, zirconia and thoria by treating the same with a fluid preconditioning agent consisting essentially of water at temperature and pressure for catalytic hydration of olefins within the ranges hereinafter recited, replacing said agent by a mixture of olefin and water and continuing to contact such mixture with the preconditioned catalyst at catalytic hydration conditions of temperature from about 250° F. to about 700° F. and pressure from about 375 to about 6,000 pounds per square inch.

2. A process for the catalytic hydration of olefins which comprises preconditioning a porous adsorptive hydration catalyst composed of inorganic oxide selected from the class consisting of alumina, silica, zirconia and thoria by treating the same with a fluid preconditioning agent consisting essentially of liquid water at temperature and pressure for catalytic hydration of olefins within the ranges hereinafter recited, said pressure being sufficient to maintain water in the liquid phase at the preconditioning temperature, replacing said agent by a mixture of olefin and water and continuing to contact such mixture with the preconditioned catalyst at catalytic hydration conditions of temperature from about 250° F. to about 700° F. and pressure from about 375 to about 6,000 pounds per square inch.

3. A process for the catalytic hydration of olefins which comprises preconditioning a porous adsorptive hydration catalyst composed of inorganic oxide selected from the class consisting of alumina, silica, zirconia and thoria by treating the same with a fluid preconditioning agent consisting essentially of water at temperature and pressure for catalytic hydration of olefins within the ranges hereinafter recited, replacing said agent by a mixture of olefin and water and continuing to contact such mixture with the preconditioned catalyst at catalytic hydration conditions of temperature from about 250° F. to about 700° F. and pressure sufficient to maintain water in the liquid phase within the range from about 375 to about 6,000 pounds per square inch.

4. A process for the catalytic hydration of olefins which comprises preconditioning a porous adsorptive hydration catalyst composed of 1 to 35 weight per cent alumina and the balance silica by treating the same with a fluid preconditioning agent consisting essentially of water at temperature and pressure for catalytic hydration of olefins within the ranges hereinafter recited, replacing said agent by a mixture of olefin and water and continuing to contact such mixture with the preconditioned catalyst at catalytic hydration conditions of temperature from about 250° F. to about 700° F. and pressure from about 375 to about 6,000 pounds per square inch.

5. A process for the catalytic hydration of propylene which comprises preconditioning a porous adsorptive hydration catalyst composed of inorganic oxide selected from the class consisting of alumina, silica, zirconia and thoria by treating the same with a fluid preconditioning agent consisting essentially of water at temperature and pressure for catalytic hydration within the ranges hereinafter recited, replacing said agent by a mixture of propylene and water and continuing to contact such mixture with the preconditioned catalyst at catalytic hydration conditions of temperature from about 250° F. to about 700° F. and pressure from about 375 to about 6,000 pounds per square inch.

6. A process for the catalytic hydration of olefins having 3 to 5 carbon atoms which comprises preconditioning a porous adsorptive hydration catalyst composed of inorganic oxide selected from the class consisting of alumina, silica, zirconia and thoria by treating the same with a fluid preconditioning agent consisting essentially of water at temperature and pressure for catalytic hydration of olefins within the ranges hereinafter recited, replacing the said agent by a mixture of said olefin and water and continuing to contact said mixture with the preconditioned catalyst at catalytic hydration conditions of temperature from about 250° F. to about 700° F. and pressure from about 375 to about 6,000 pounds per square inch.

SIGMUND J. LUKASIEWICZ.
WILLIAM I. DENTON.

References Cited in the file of this patent

UNITED STATES PATENTS

| Number | Name | Date |
|---|---|---|
| 2,477,380 | Kreps et al. | July 26, 1949 |
| 2,486,980 | Robinson | Nov. 1, 1949 |
| 2,496,621 | Deering | Feb. 7, 1950 |
| 2,504,618 | Archibald et al. | Apr. 18, 1950 |
| 2,519,061 | Mason | Aug. 15, 1950 |